UNITED STATES PATENT OFFICE 2,649,483

MIXED LOWER TRIALKANOLAMINES

Myron E. Huscher, Merton W. Long, Jr., and John C. Moore, Midland, Mich., assignors to The Dow Chemical Company, Midland, Mich., a corporation of Delaware No Drawing. Application January 26, 1948, Serial No. 4,466

3 Claims. (Cl. 260—584)

This invention relates to certain new trialkanolamines and to methods of making them.

The chemical compounds of the present invention correspond to the general formula

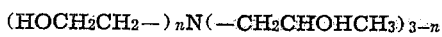
$$(HOCH_2CH_2-)_nN(-CH_2CHOHCH_3)_{3-n}$$

where $n$ is 1 or 2. They are useful in the manufacture of emulsifying agents and as stabilizing agents for polystyrene and related synthetic resins.

The new compounds are most conveniently prepared by the reaction of (a) an alkanolamine containing 1 or 2 alkylene radicals per molecule, each such radical having 2 or 3 carbon atoms, with (b) an olefin oxide also having 2 or 3 carbon atoms per molecule but having a different number of carbon atoms than that of at least one of the alkylene radicals of the alkanolamine, such olefin oxide being in a proportion approximately equivalent stoichiometrically to that required to produce a trialkanolamine.

The alkanolamine reactants referred to may be either monoalkanolamines, i. e. monoethanolamine and monoisopropanolamine, or dialkanolamines, i. e. diethanolamine, diisopropanolamine, or monoethanolmonoisopropanolamine (J. Org. Chem. 11, 288 (1946)). The olefin oxide reactant is either ethylene oxide or propylene oxide depending on the desired final product. In the reaction of one mole of monoalkanolamine, approximately two moles of the olefin oxide are used, whereas with a dialkanolamine reactant an approximately one-to-one mole ratio of olefin oxide is employed.

According to a preferred procedure for making the new compounds, the olefin oxide is added gradually to the alkanolamine in a vessel provided with a reflux condenser and agitator. The process is conveniently carried out at ordinary temperatures, the reaction beginning promptly when the reactants are mixed together at any temperature above about 0° C. Inasmuch as the reaction is highly exothermic, the olefin oxide should be added slowly, and it may also be desirable to provide artificial cooling, since in general the temperature should not exceed 100° C. if formation of undesirable by-products is to be prevented. Temperatures of 20° C. to 80° C. are quite satisfactory.

The process is preferably carried out simply by mixing the two reactants in the absence of water or other diluents. However, such substances may be tolerated in some instances.

After the appropriate proportion of olefin oxide has been completely added to the alkanolamine, the mixture is retained at a reaction temperature until evolution of heat stops. The resulting mixture is then worked up, usually by rectification at reduced pressure, to separate the desired trialkanolamine product.

The following examples will further illustrate the invention.

Example 1

A charge of 8.0 gram-moles of anhydrous diethanolamine at 25° C. was placed in a reaction vessel provided with an agitator and a reflux condenser. Propylene oxide, 7.45 gram-moles in all, was added slowly over a period of several hours, cooling being applied as needed to limit the temperature to below 70° C. Following addition of the propylene oxide, the mixture was agitated for several hours more to insure completion of the reaction. The product, which was a colorless liquid, was separated into its components by rectification in a heated column at an absolute pressure of 1.0 mm. of mercury. The cut boiling at 148° C. to 152° C. at this pressure was taken as diethanolmonoisopropanolamine. This cut constituted 93.2 percent by weight of the reaction product, the other cuts being diethanolamine, 6.6 percent, and high boiling residue, 0.2 percent.

The purified diethanolmonoisopropanolamine (N,N-bis (2-hydroxyethyl)-1-amino-2-propanol) ($C_7H_{17}NO_3$) was a white solid which solidified at 30.6° C., and had a specific gravity of 1.079 at 25°/25° C. and a refractive index of 1.4752 $n_D^{25°}$. The vapor pressure at 156° C. was 3.0 mm. of mercury and at 260° C. was 144 mm.; decomposition began at 268° C. Absolute voscosity at 25° C. was 1667 centipoises. Specific heat was 0.720 at 40° C. and 0.777 at 120° C.

Example 2

To a charge of 10.0 gram-moles of anhydrous monoethanolamine, 19.6 gram-moles of propylene oxide was added slowly over a period of several hours, the temperature being controlled to below 70° C. The mixture was then allowed to stand overnight, a colorless liquid being obtained. The product was separated into its components by rectification at reduced pressure, as follows: diisopropanolmonoethanolamine, 97.5 percent by weight; monoisopropanolmonoethanolamine, 2.5 percent.

The purified diisopropanolmonoethanolamine (N-(2-hydroxyethyl)-1,1'-imino di-2-propanol) ($C_8H_{19}NO_3$) was a colorless liquid which did not solidify at −30° C. but on standing 8 days at −70° C. slowly congealed to a glassy solid. The compound had a specific gravity of 1.043 at 25°/25° C., and a refractive index of 1.4693 $n_D^{25°}$. The vapor pressure at 225° C. was 54.6 mm. of mercury at 316° C. was 760 mm. Heat of vaporization was 95.5 calories per gram. Specific heat at 40° C. was 0.755 and at 120° C. was 0.810.

The new trialkanolamines of the present invention exhibit properties which render them quite distinct in character from previously known trialkanolamines such as triethanolamine and triisopropanolamine. Thus, they are colorless, as contrasted to most commercial grades of triethanolamine, and exhibit far greater color stability than even highly purified triethanolamine. They are likewise much more oil-soluble than triethanolamine. As compared to triisopropanolamine, which is a solid at ordinary temperatures, one of the new compounds is a liquid which shows no tendency to freeze at temperatures below those normally encountered in nature. When used in making emulsifying agents by methods commonly employed with triethanolamine and triisopropanolamine, the new compounds form substances of markedly greater emulsifying power. Further, when employed as stabilizing agents for polystyrene and like resins, the new compounds are more compatible than triethanolamine, are distinctly more effective as light stabilizers than triethanolamine, triisopropanolamine, or mixtures thereof, and also are markedly better heat stabilizers than these latter materials.

This application is a continuation-in-part of our co-pending application Serial No. 736,074, filed March 20, 1947, now Patent No. 2,602,819.

What is claimed is:

1. A trialkanolamine corresponding to the general formula $$(HOCH_2CH_2-)_nN(CH_2-CHOHCH_3)_{3-n}$$

wherein $n$ is a positive integer less than 3.

2. Diethanolmonoisopropanolamine having a boiling point of about 156° C. at 3.0 mm. of mercury absolute pressure.

3. Monoethanoldiisopropanolamine having a boiling point of about 152° C. at 3.0 mm. of mercury absolute pressure.

MYRON E. HUSCHER.
MERTON W. LONG, Jr.
JOHN C. MOORE.

References Cited in the file of this patent

UNITED STATES PATENTS

| Number | Name | Date |
|---|---|---|
| 2,186,392 | Reynhart | Jan. 9, 1940 |
| 2,190,133 | Epstein et al. | Feb. 13, 1940 |
| 2,205,042 | Lenher et al. | June 18, 1940 |
| 2,228,989 | De Groote et al. | Jan. 13, 1941 |
| 2,236,529 | Epstein et al. | Apr. 1, 1941 |
| 2,297,221 | Huttenlocher | Sept. 29, 1942 |
| 2,337,004 | Schwoegler | Dec. 14, 1943 |
| 2,373,199 | Schwoegler et al. | Apr. 10, 1945 |
| 2,451,942 | Gresham | Oct. 19, 1948 |

OTHER REFERENCES

Knorr et al.: Berichte, vol. 31 (1898), pages 1069–1077.

Kitchen et al.: J. Organic Chem., vol. 8 (1943), pages 342–343.

Fiero: J. Amer. Pharmaceutical Assn., vol. 28 (1939), pages 1036–1040.